United States Patent [19]

Sugimoto

[11] 4,319,501
[45] Mar. 16, 1982

[54] CONTROL SYSTEM FOR A TRANSMISSION FOR VEHICLES

[75] Inventor: Hiroshi Sugimoto, Aichi, Japan

[73] Assignee: Toyota Jidosha Kogyo Kabushiki Kaisha, Aichi, Japan

[21] Appl. No.: 125,582

[22] Filed: Feb. 28, 1980

[30] Foreign Application Priority Data

Mar. 14, 1979 [JP] Japan .................................. 54-29637

[51] Int. Cl.³ ............................................. B60K 41/06
[52] U.S. Cl. ........................................ 74/866; 74/856; 74/864
[58] Field of Search ................ 74/866, 843, 856, 861, 74/863, 864

[56] References Cited

U.S. PATENT DOCUMENTS

| | | | |
|---|---|---|---|
| 3,726,159 | 4/1973 | Mizote | 74/866 |
| 3,813,964 | 6/1974 | Ichimura et al. | 74/864 X |
| 3,881,368 | 5/1975 | Furuhashi | 74/866 |
| 3,903,759 | 9/1975 | Hashimoto | 74/866 |
| 3,922,933 | 12/1975 | Sakai et al. | 74/866 |
| 3,938,409 | 2/1976 | Uozumi | 74/866 |
| 3,943,799 | 3/1976 | Sakai et al. | 74/866 |
| 4,039,061 | 8/1977 | Pruvot et al. | 74/866 X |
| 4,226,295 | 10/1980 | Rembold et al. | 74/866 |
| 4,253,348 | 3/1981 | Will et al. | 74/866 |

FOREIGN PATENT DOCUMENTS

| | | | |
|---|---|---|---|
| 2321616 | 11/1974 | Fed. Rep. of Germany | 74/861 |
| 2338122 | 2/1975 | Fed. Rep. of Germany | 74/866 |

Primary Examiner—Leslie Braun
Attorney, Agent, or Firm—Stevens, Davis, Miller & Mosher

[57] ABSTRACT

A control system for a transmission operable in high and low speed stages and adapted to change over the transmission between the two stages according to the balance of a throttle opening and vehicle speed, and to maintain the transmission at the low speed stage when throttle opening is abruptly reduced to less than a predetermined relatively small opening in order to effect engine braking when the transmission has been operating at the low speed stage.

4 Claims, 3 Drawing Figures

CONTROL SYSTEM FOR A TRANSMISSION FOR VEHICLES

BACKGROUND OF THE INVENTION

The present invention related to an automatic transmission for vehicles, and, more particularly, to a control system for changing over a transmission between a high speed stage and a low speed stage according to the balance of a throttle opening of the engine and vehicle speed.

A transmission for vehicles which has actuators and is adapted to be changed over between a high speed stage and a low speed stage according to operation of the actuators is known and is used as an overdrive means, an auxiliary transmission or a two-stage transmission for vehicles. A transmission of this kind is generally controlled by an electronic control system including a throttle sensing means which measures the throttle opening of the engine and generates a throttle signal representing throttle opening of the engine, a vehicle speed sensing means which measures vehicle speed and generates a vehicle speed signal representing vehicle speed, a shift signal generating means which generates an upshift signal or a downshift signal based upon the balance between the throttle signal and the vehicle speed signal, and an actuator control means which changes over operation of the actuators according to the upshift or downshift signal dispatched from the shift signal generating means so that the transmission is set at the high speed stage when throttle opening and vehicle speed are in a predetermined coordinated high speed range and the transmission is set at the low speed range when throttle opening and vehicle speed are in a predetermined coordinated low speed range. In this case, the coordinated high and low speed ranges are generally so determined that, when vehicle speed is higher than a predetermined relatively high value, the transmission is set at the high speed stage regardless of the value of throttle opening, and, when the vehicle speed is lower than a predetermined relatively low value, the transmission is set at the low speed stage regardless of the value of throttle opening.

In a transmission of this kind there is a problem that, when the depression of the accelerator pedal is rapidly released in order to effect engine braking under such a running condition of the vehicle that the vehicle speed is relatively high while the accelerator pedal is relatively deeply depressed with the transmission thereby still being set at the low speed stage, the balance between throttle opening and vehicle speed is shifted from the coordinated low speed range to the coordinated high speed range due to the abrupt reduction of throttle opening which occurs prior to the corresponding reduction of vehicle speed due to engine braking, and accordingly the transmission is shifted up from the low speed stage to the high speed stage, thereby lessening to a large degree the effect of the engine braking.

SUMMARY OF THE INVENTION

It is therefore the object of the present invention to provide an improved control system for a transmission for vehicles in which the abovementioned problem is solved so that, when the depression of the accelerator pedal is abruptly reduced in order to effect engine braking during the low speed stage operation of the transmission, upshifting of the transmission to the high speed stage is suppressed even when the balance between throttle opening and vehicle speed is shifted from the coordinated low speed range to the coordinated high speed range.

Another object of the present invention is to further improve the abovementioned control system so that it returns the transmission set at the low speed stage under the abovementioned suppression of upshifting directly to the normal low speed stage when the accelerator pedal is again abruptly depressed so that the balance between throttle opening and vehicle speed still maintained in the coordinated high speed range is abruptly shifted to the coordinated low speed range.

BRIEF DESCRIPTION OF THE DRAWING

These and other objects of the present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Figure 1:
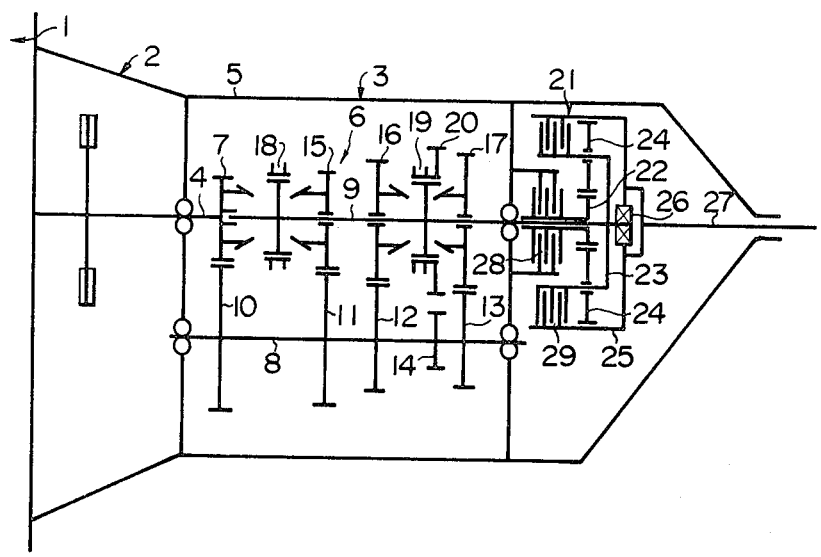
FIG. 1 is a diagrammatical view of a transmission for vehicles which incorporates an auxiliary transmission.

Referring to FIG. 1, reference numeral 1 designates a part of an internal combustion engine to which is connected a clutch 2 through which an input shaft 4 of a transmission 3 is driven. The transmission 3 has a transmission case 5 in which is mounted a main transmission mechanism 6 which provides four forward speed stages and one reverse stage and an auxiliary transmission mechanism 21 which provides a high speed stage and a low speed stage.

The input shaft 4 is rotatably supported by the case 5 and supports a gear 7 mounted at its one end. Furter, in parallel to and in alignment to the input shaft 4 are provided a counter shaft 8 and a drive shaft 9, each being rotatably supported by the case 5. The counter shaft 8 supports five counter gears 10, 11, 12, 13 and 14, each being firmly mounted to it. The counter gear 10 is constantly meshed with the gear 7 so as to transmit rotation of the input shaft 4 to the counter shaft 8. The drive shaft 9 supports a third speed gear 15, a second speed gear 16 and a first speed gear 17 so as to be rotatable relative to it. The third speed gear 15 is constantly meshed with the counter gear 11; the second speed gear 16 is constantly meshed with the counter gear 12; and the first speed gear 17 is constantly meshed with the counter gear 13. A 3-4 speed synchronizer 18 is provided between the gear 7 and the third speed gear 15. A 1-2 speed synchronizer 19 is provided between the second speed gear 16 and the first speed gear 17. These synchronizers may be of a well known type such as Borg-Warner type. When the hub sleeve of the 3-4 speed synchronizer 18 is shifted leftward in the figure, the input shaft 4 and the drive shaft 9 are directly connected with each other, thereby setting the main transmission at its fourth speed stage, whereas, when the hub sleeve is shifted rightward in the figure, the third speed gear 15 is connected to the drive shaft 9, thereby setting the main transmission at its third speed stage. On the other hand, when the hub sleeve of the 1-2 speed synchronizer 19 is shifted leftward in the figure, the second speed gear 16 is connected to the drive shaft 9, thereby setting the main transmission at its second speed stage, whereas, when the hub sleeve is shifted rightward in the figure, the first speed gear 17 is connected to the drive shaft 9, thereby setting the main transmission at its first speed stage. The 1–2 speed synchronizer 19 further includes a reverse gear 20 mounted to it hub sleeve, which is drivingly connected with the counter gear 14 when an idle gear not shown in the figure is selectively brought into engagement between the reverse gear 20 and the counter gear 14, thereby setting the main transmission at its reverse stage. The changing-over operation of the synchronizers 18 and 19 is effected by a manual shift lever not shown in the figure in the well known manner of manual shifting.

The auxiliary transmission mechanism 21 includes a planetary gear mechanism having a sun gear 22 supported by the drive shaft 9 so as to be rotatable relative to the drive shaft, a planetary carrier 23 fixedly connected to the drive shaft 9, a ring gear 25 arranged to be coaxial to the sun gear 22 and a plurality of planetary pinions 24 rotatably supported by the carrier 23 and meshed with the sun gear 22 and the ring gear 25. A one-way cluthch 26 is incorporated between the ring gear 25 and the drive shaft 9 so as to prevent the drive shaft 9 from overrunning the ring gear 25 which is connected with an output shaft 27. 28 designates a brake which selectively prevents rotation of the sun gear 22. Further, 29 designates a clutch which selectively connects a carrier 23 and the ring gear 25. The brake 28 and the clutch 29 are operated by solenoids 30 and 31 (FIG. 2), respectively.

When the solenoid 30 for the brake is energized while the solenoid 31 for the clutch is deenergized, the brake 28 is engaged, whereas the clutch 29 is disengaged. In this condition, the rotary power of the drive shaft 9 is transmitted to the output shaft 27 through the carrier 23, the planetary pinions 24 and the ring gear 25 with its rotational speed being increased. On the other hand, when the solenoid 30 for the brake is deenergized while the solenoid 31 for the clutch is energized, the brake 28 is disengaged, whereas the clutch 29 is engaged. In this condition, the carrier 23 and the ring gear 25 is connected with each other, thereby setting the auxiliary transmission 21 at its directly connected condition. In this case, therefore, the rotational power of the drive shaft 9 is directly transmitted to the output shaft 27 without changing its rotational speed.

Figure 2:
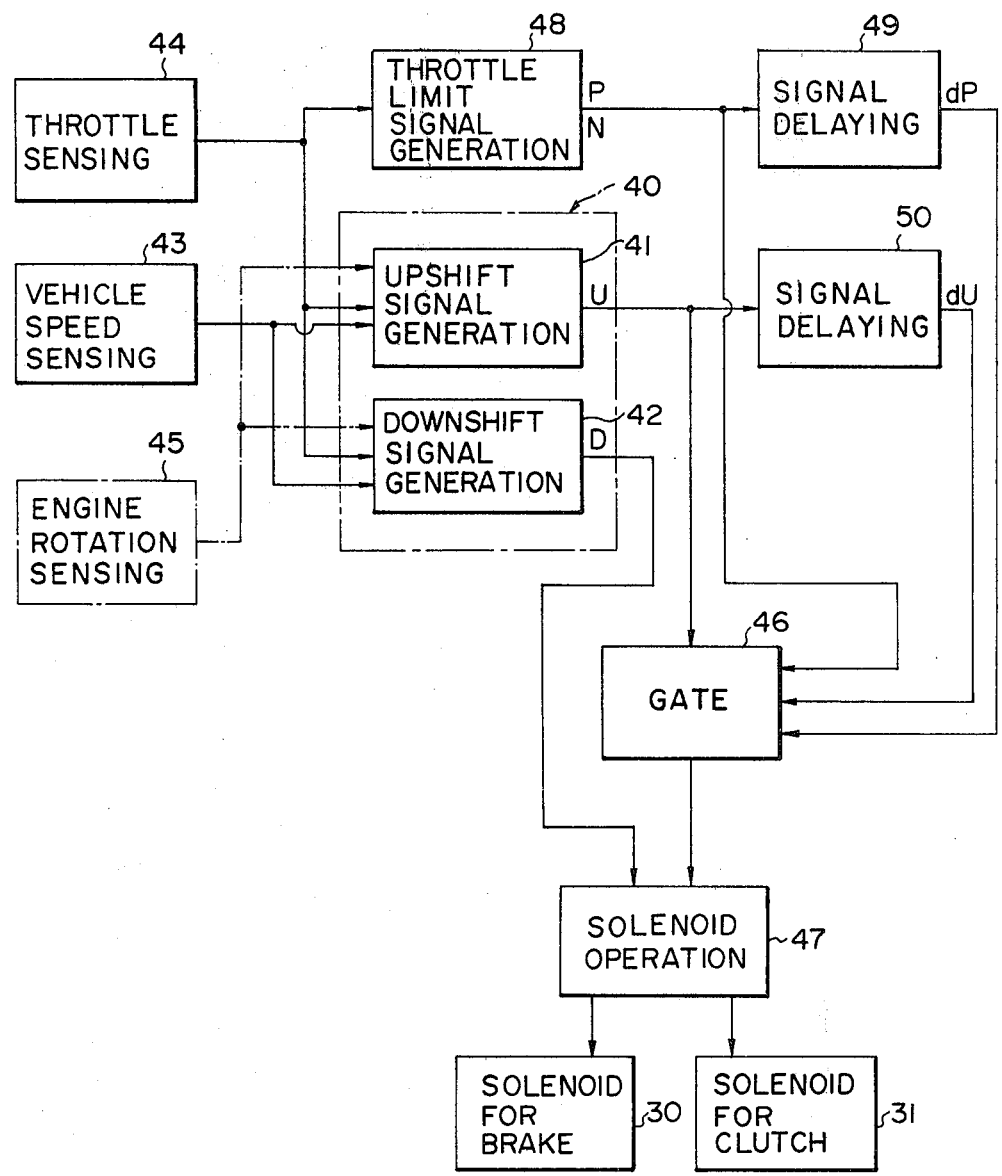
FIG. 2 is a diagram showing an embodiment of the control system according to the present invention.

FIG. 2 is a diagram showing an embodiment of the control system according to the present invention for controlling the auxiliary transmission 21 shown in FIG. 1. The control system includes a computing device 40 including an upshift signal generating means 41 and a downshift signal generating means 42. These upshift and downshift signal generating means are supplied with a throttle signal representing throttle opening of the engine which is generated by a throttle sensing means 44 which measures throttle opening of the engine and generates the throttle signal, and a vehicle speed signal representing vehicle speed which is generated by a vehicle speed sensing means 43 which measures vehicle speed and generates the vehicle speed signal. As an alternative modification, an engine rotational speed sensor 45 may be used as a substitute for the vehicle speed sensor 43 so as to provide an engine rotational speed signal as a substitute for the vehicle speed signal.

Figure 3:
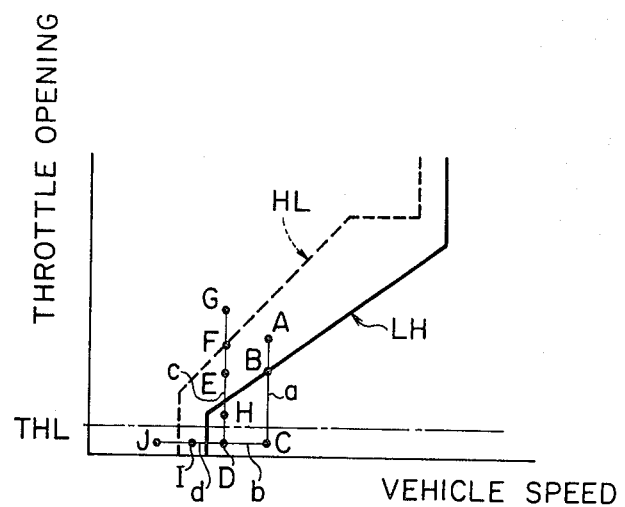
FIG. 3 is a diagram showing an example of the coordinated high and low speed ranges of the balance between throttle opening and vehicle speed.

The upshift signal generating means 41 coordinates the throttle signal and the vehicle speed signal received respectively from the throttle sensing means 44 and the vehicle speed sensing means 43 and generates an upshift signal U when throttle opening and vehicle speed are in a predetermined coordinated high speed range such as the range located on the right side of the solid line LH in FIG. 3. On the otherhand, the downshift signal generating means 42 coordinates the throttle signal and the vehicle speed signal received respectively from the throttle sensing means 44 and the vehicle speed sensing means 43 and generates a downshift signal D when throttle opening and vehicle speed are in a predetermined coordinated low speed range such as the range located on the left side of the broken line HL in FIG. 3.

In a shift diagram such as shown in FIG. 3, the line LH is generally called an upshift line, whereas the line HL is generally called a downshift line. In general, when the condition with respect to throttle opening and vehicle speed traverses the upshift line LH from its left side to its right side, the transmission is shifted up from its low speed stage to its high speed stage, whereas, when the condition with respect to throttle opening and vehicle speed traverses the downshift line HL from its right side to its left side, the transmission is shifted down from its high speed range to its low speed range. The relative shifting of the upshift and downshift lines provides a hysterisis between upshifting and downshifting which stabilizes operation of the transmission.

The upshift signal U generated by the upshift signal generating means 41 is supplied through a gate means 46 described hereinunder to a solenoid operating means 47 which reciprocally energizes and deenergizes the solenoid 30 for the brake 28 and the solenoid 31 for the clutch 29. On the other hand, the downshift signal D generated by the downshift signal generating means 42 is directly supplied to the solenoid operating means 47. The solenoid operating means 47 energizes the solenoid 30 while deenergizing the solenoid 31 when the upshift signal U was once supplied to it, whereas it energizes the solenoid 31 while deenergizing the solenoid 30 when the downshift signal D was once supplied to it.

The control system further comprises a throttle limit signal generating means 48 which receives the throttle signal from the throttle sensing means 44 and generates a first throttle limit signal P when throttle opening of the engine is larger than a predetermined relatively small opening THL and a second throttle limit signal N when throttle opening of the engine is smaller than said predetermined opening THL. The second throttle limit signal N is directly supplied to the gate 46. The first throttle limit signal P may also be directly supplied to the gate means 46 according to a first embodiment of the present invention. However, more desirably, according to a second embodiment of the present invention, the first throttle limit signal P is supplied to a signal delaying means 49 which generates a delayed signal dP of the first throttle limit signal which it receives, and this delayed first throttle limit signal dP is supplied to the gate means 46.

Another signal delaying means 50 is provided so as to receive the upshift signal U from the upshift signal generating means 41 and to generate a delayed signal dU of the upshift signal, this delayed upshift signal dU being supplied to the gate means 46. The gate means 46 is adapted to control transmittance of the upshift signal U to the solenoid operating means 47 based upon the second throttle limit signal N, the delayed upshift signal dU, and either the first throttle limit signal P or the delayed first throttle limit signal dP in such a manner that it blocks transmittance of the upshift signal U therethrough when the second throttle limit signal N was given before the delayed upshift signal dU is given. This blocking is released, according to the first embodiment, when the first throttle limit signal P was given to the gate means 46, whereas, according to the second embodiment, this blocking is released when the delayed first throttle limit signal dP was given to the gate means 46.

Let us assume that the vehicle equipped with the control system of the present invention is running under the condition indicated by point A in FIG. 3. If the driver abruptly releases depression of the accelerator pedal so as to effect engine braking, the operating condition of the vehicle will be brought from point A to point C along line a. During this shifting of operating condition, at point B the upshift signal generating means 41 generates the upshift signal U. Therefore, if the present invention were not incorporated in the control system for the transmission, the transmission would be shifted up, thereby largely reducing the effect of engine braking. In accordance with the present invention, however, when this shift line a traverses a line of the limit throttle opening THL, the output of the throttle limit signal generating means 48 changes from the first throttle limit signal P to the second throttle limit signal N, the latter being immediately supplied to the gate means 46. On the other hand, after the lapse of a time effected by the signal delaying means 50 from the instant when the shift line a traversed the upshift line LH at point B the delayed upshift signal dU is given to the gate means 46. Therefore, if the time constant of the signal delaying means 50 is properly adjusted, it is effected that the second throttle limit signal N is given to the gate means 46 before the delayed upshift signal dU reaches the gate means 46. In this case, the transmittance of the upshift signal U to the solenoid operating means 47 is blocked by the gate means 46, and therefore the auxiliary transmission 21 is maintained at the low speed stage.

When the accelerator pedal has been maintained as undepressed or released for a while, the vehicle is decelerated and the operating condition of the vehicle will shift from point C to point D along a shift line b.

When the accelerator pedal is again abruptly depressed at point D relatively deeply so that the operating condition is brought to point E along a shift line c, at the instant when the shift line c traverses the throttle limit line of THL the output of the throttle limit signal generating means 48 changes from the second throttle limit signal N to the first throttle limit signal P.

In this case, according to the first embodiment of the present invention, as the first throttle limit signal P is given to the gate means 46, it releases its blocking of transmittance of the upshift signal U, and therefore, the upshift signal U is given to the solenoid operating means 47, thereby effecting changing-over of the auxiliary transmission 21 from the low speed stage to the high speed stage. In this case, therefore, at point E the auxiliary transmission operates at the high speed stage. If, however, the accelerator pedal is depressed so deeply that the operating condition is shifted to point G, the auxiliary transmission 21 is again changed over from the high speed stage to the low speed stage at point F, and at point G it operates at the low speed stage.

According to the second embodiment of the present invention, in which the gate means 46 releases its blocking of transmittance of the upshift signal U when it receives the delayed first throttle limit signal dP, the blocking is released after a delay time effected by the signal delaying means 49 has lapsed from the time point when the shift line c traversed the throttle limit line of THL. Therefore, it the time constant of the signal delaying means 49 is properly adjusted, this delayed first throttle limit signal dP arrives at the gate means 46 after the shift line c has already traversed the upshift line LH, i.e. after the upshift signal generating means 41 has ceased to generate the upshift signal U. In this case, therefore, the auxiliary transmission 21 is stably returned to its low speed stage at which it had been operating before engine braking was effected, without being subsequently or temporarily shifted up to the high speed stage when the accelerator pedal was again depressed.

On the other hand, when the accelerator pedal is again depressed slightly from point D so as to shift the operating condition from point D to point H, the upshift signal generating means 41 is still generating the upshift signal U when the delayed first throttle limit signal dP reaches the gate means 46 so as to release its blocking, whereby the solenoid operating means 47 is then supplied with the upshift signal U, whereupon the solenoid operating means 47 operates, so as to change over energization and deenergization of the solenoids 30 and 31. Therefore, the auxiliary transmission 21 is shifted up so as to operate stably at the high speed stage at point E.

In both embodiments, when the accelerator pedal has been maintained as released so long that the operating condition shifts from point D to point I or J along line d, when the line d traverses the upshift line LH the upshift signal output U from the upshift signal generating means 41 disappears. Therefore, when the accelerator pedal is again depressed slightly or deeply, this being absolutely necessary to resume driving of the vehicle, the blocking of the upshift signal by the gate 46 is released when the first throttle limit signal P or the delayed first throttle limit signal dP is supplied to the gate means 46, so as to maintain the control system stably at the low speed stage and to set it ready for upshifting when required.

Although the invention has been shown and described with respect to some preferred embodiments thereof, it should be understood that various changes and omissions of the form and details thereof may be made therein by those skilled in the art without departing from the scope of the invention.

I claim:

1. In a vehicle including an internal combustion engine and a transmission which has actuators and is adapted to be changed over between a high speed stage and a low speed stage according to operation of the actuators, a control system for the transmission comprising, a throttle sensing means which measures throttle opening of the engine and generates a throttle signal representing throttle opening of the engine, a vehicle speed sensing means which measures vehicle speed and generates a vehicle speed signal representing vehicle speed, an upshift signal generating means which receives said throttle signal and said vehicle speed signal and generates an upshift signal when throttle opening and vehicle speed are in a predetermined coordinated high speed range, a downshift signal generating means which receives said throttle signal and said vehicle speed signal and generates a downshift signal when throttle opening and vehicle speed are in a predetermined coordinated low speed range, a throttle limit signal generating means which receives said throttle signal and generates a first throttle limit signal when throttle opening of the engine is larger than a predetermined relatively small opening and a second throttle limit signal when throttle opening of the engine is smaller than said predetermined relatively small opening, a signal delaying means which receives said upshift signal and generates a delayed upshift signal, and an actuator control means which changes over operation of said actuators so that once said upshift signal is provided, the transmission is set at said high speed stage and once said downshift signal is provided the transmission is set at said low speed stage, a first signal conducting means which conducts said upshift signal from said upshift signal generating means to said actuator control means, a second signal conducting means which conducts said downshift signal from said downshift signal generating means to said actuator control means, and a gate means provided at a middle portion of said first signal conducting means, said gate means being controlled by said delayed upshift signal, said second throttle limit signal and said first throttle limit signal so as to block transmittance of said upshift signal when said second throttle limit signal is provided before said delayed upshift signal is provided, and to release said blocking when said first throttle limit signal is provided.

2. In a vehicle including an internal combustion engine and a transmission which has actuators and is adapted to be changed over between a high speed stage and a low speed stage according to operation of the actuators, a control system for the transmission comprising, a throttle sensing means which measures throttle opening of the engine and generates a throttle signal representing throttle opening of the engine, a vehicle speed sensing means which measures vehicle speed and generates a vehicle speed signal representing vehicle speed, an upshift signal generating means which receives said throttle signal and said vehicle speed signal and generates an upshift signal when throttle opening and vehicle speed are in a predetermined coordinated high speed range, a downshift signal generating means which receives said throttle signal and said vehicle speed signal and generates a downshift signal when throttle opening and vehicle speed are in a predetermined coordinated low speed range, a throttle limit signal generating means which receives said throttle signal and generates a first throttle limit signal when throttle opening of the engine is larger than a predetermined relatively small opening and a second throttle limit signal when throttle opening of the engine is smaller than said predetermined relatively small opening, a first signal delaying means which receives said upshift signal and generates a delayed upshift signal, a second signal delaying means which receives said first throttle limit signal and generates a delayed first throttle limit signal, an actuator control means which changes over operation of said actuators so that once said upshift signal is provided the transmission is set at said high speed stage and once said downshift signal is provided the transmission is set at said low speed stage, a first signal conducting means which conducts said upshift signal from said upshift signal generating means to said actuator control means, a second signal connecting means which conducts said downshift signal from said downshift signal generating means to said actuator control means, and a gate means provided at a middle portion of said first signal conducting means, said gate means being controlled by said delayed upshift signal, said second throttle limit signal and said delayed first throttle limit signal so as to block transmittance of said upshift signal when said second throttle limit signal is provided before said delayed upshift signal is provided, and to release said blocking when said delayed first throttle limit signal is provided.

3. The control system of claim 1 or 2, wherein said transmission is an auxiliary transmission.

4. The control system of claim 1 or 2, wherein said actuator control means includes a first solenoid which sets the transmission at said high speed stage when energized, a second solenoid which sets the transmission at said low speed stage when energized, and a solenoid operating means which reciprocally energizes and deenergizes said first and second solenoids in a manner that it energizes said first solenoid while it deenergizes said second solenoid when said upshift signal is provided thereto and it energizes said second solenoid while it deenergizes said first solenoid when said downshift signal is provided thereto.

* * * * *